(12) United States Patent
Ukai et al.

(10) Patent No.: US 8,328,425 B2
(45) Date of Patent: Dec. 11, 2012

(54) SPLIT-TYPE SLIDING BEARING FOR A CRANKSHAFT IN INTERNAL COMBUSTION ENGINE AND SPLIT-TYPE SLIDING DEVICE

(75) Inventors: Tomohiro Ukai, Inuyama (JP); Osamu Ishigo, Inuyama (JP); Yasushi Saito, Inuyama (JP)

(73) Assignee: Daido Metal Company Ltd., Naka-Ku, Nagoya (JP)

( * ) Notice: Subject to any disclaimer, the term of this patent is extended or adjusted under 35 U.S.C. 154(b) by 286 days.

(21) Appl. No.: 12/647,149

(22) Filed: Dec. 24, 2009

(65) Prior Publication Data
US 2010/0166349 A1 Jul. 1, 2010

(30) Foreign Application Priority Data
Dec. 26, 2008 (JP) .................................. 2008-333845

(51) Int. Cl.
*F16C 9/02* (2006.01)
*F16C 33/02* (2006.01)
*F16C 35/00* (2006.01)

(52) U.S. Cl. ......... 384/294; 384/278; 384/429; 384/434

(58) Field of Classification Search .................. 384/278, 384/294, 429, 432, 433, 434; 123/195 R
See application file for complete search history.

(56) References Cited

U.S. PATENT DOCUMENTS

| 4,073,550 | A | * | 2/1978 | Yahraus | 384/288 |
| 6,120,187 | A | * | 9/2000 | Ono et al. | 384/273 |
| 2010/0119181 | A1 | * | 5/2010 | Ishigo et al. | 384/294 |
| 2010/0166350 | A1 | * | 7/2010 | Kuwabara et al. | 384/278 |
| 2010/0166351 | A1 | * | 7/2010 | Kuwabara et al. | 384/278 |

FOREIGN PATENT DOCUMENTS

| JP | 8210355 A | 8/1996 |
| JP | 10175131 A | 6/1998 |

* cited by examiner

*Primary Examiner* — Thomas R Hannon
*Assistant Examiner* — Adam D Rogers
(74) *Attorney, Agent, or Firm* — Browdy and Neimark, PLLC

(57) ABSTRACT

A split-type sliding bearing for a crankshaft in an internal combustion engine fits within a bearing housing having a housing half with a higher thermal expansion coefficient, and a housing half with a lower thermal expansion coefficient. The pair of semi-cylindrical bearings includes first and second semi-cylindrical bearings, the first being supported on the housing half having a higher thermal expansion coefficient, and the second being supported on the housing half having a lower thermal expansion coefficient. The first and second semi-cylindrical bearings have equal outer diameter, and the first has circumferential ends having a thickness smaller than that of the opposite circumferential ends of the second semi-cylindrical bearing.

20 Claims, 6 Drawing Sheets

SPLIT-TYPE SLIDING BEARING FOR A CRANKSHAFT IN INTERNAL COMBUSTION ENGINE AND SPLIT-TYPE SLIDING DEVICE

TECHNICAL FIELD

The present invention relates to a split-type sliding bearing for a crankshaft in an internal combustion engine, comprised of a pair of semi-cylindrical bearings which are mated to each other to form a cylindrical body when used and is used by being fitted in a split-type bearing housing. The bearing housing has a cylindrical bearing hole which is bi-split so as to be aligned with the semi-cylindrical bearings in the mated condition and comprised of a pair of housing halves (see JP-A-08-210355, for example).

BACKGROUND OF THE INVENTION

A split-type sliding bearing for a crankshaft in an internal combustion engine is comprised of a pair of semi-cylindrical halves which are fitted in a housing half which is a part of an engine block and a housing half which is a bearing cap, so as to be formed into a cylindrical body. A bearing retaining bore in the split-type bearing housing is machined in a single working process so as to have a true-circle shape in the condition that the pair of housing halves are mated with each other by fastening bolts, before the pair of semi-cylindrical bearings are fitted therein.

In recent years, an engine block made of an aluminum alloy is used in general in order to reduce the weight of the internal combustion engine in an internal combustion engine for a passenger vehicle. In this case, one of the housing halves of an usual split-type bearing housing for a crankshaft is a part of the engine block made of an aluminum alloy, and the other one is a bearing cap made of iron alloy.

On the other hand, semi-cylindrical bearings of a usual split-type sliding bearing for a crankshaft is composed of a steel back plate and a bearing alloy layer. The outer surface of the split-type sliding bearing comprised of a pair of semi-cylindrical bearings has a circumferential length which is longer than that of the inner surface of the split-type bearing housing by a predetermined length. With this dimensional relationship, when the pair of semi-cylindrical bearings is fitted in the split-type bearing housing, a circumferential compressive stress is induced in the pair of semi-cylindrical bearings, and at the same time, a radial stress is also induced therein. Accordingly, the pair of semi-cylindrical bearings is fixed to the inner surface of the split-housing body in close contact, and the split-type bearing housing is elastically deformed so as to radially expand, resulting in an increase of its inner diameter.

The inner surface of the split-type sliding bearing comprised of the pair of semi-cylindrical halves and the outer surface of the crankshaft define therebetween a bearing clearance for feeding lubrication oil. If the bearing clearance is excessively large, the crankshaft would have a play, and as a result, vibration and noise would be caused from the internal combustion engine.

The inner diameter of the bearing retaining bore in the split-type bearing housing and the outer diameter of the crankshaft inevitably incur machining errors during manufacturing thereof. Thus, the space between the split-type bearing housing and the crankshaft becomes uneven. In order to appropriately set the bearing clearance between the inner surface of the split-type bearing housing and the outer surface of the crankshaft, a split-type sliding bearing having a suitable wall thickness is selected so as to restrain unevenness of the bearing clearance.

As stated above, however, when the split-type sliding bearing is incorporated in the split-type bearing housing, the inner diameter of the split-type bearing housing is expanded and deformed in the radial direction thereof. When the above-mentioned expansive deformation is generated, the bearing clearance is increased from a designed bearing clearance which is determined by the inner diameter of the bearing retaining bore in the split-type bearing housing, the outer diameter of the crankshaft and wall thickness of the semi-cylindrical bearings, by a degree of expansive deformation of the semi-cylindrical bearing housing. The above-mentioned expansive deformation also incurs unevenness.

JP-A-10-175131 discuses the above-mentioned unevenness, and proposes reducing the unevenness among sizes of the space between the split-type bearing housing and the crankshaft, which is caused by the expansive deformation of the split-type bearing housing, by a selective combination between the circumferential length of the split-type sliding bearing and the inner diameter of the bearing retaining bore of the split-type bearing housing in order to reduce the unevenness of the bearing clearance.

In order to reduce the weight of the internal combustion engine, the stiffness of the split-type bearing housing for a crankshaft has been conventionally decreased. An engine block made of an aluminum alloy is broadly used in order to reduce the weight.

Explanation will be made below of the relationship between the split-type bearing housing and the split-type sliding bearing comprised of a pair of semi-cylindrical bearings which are incorporated in the split-type bearing housings, referring to FIGS. 9 and 10.

The split-type bearing housing shown in FIG. 9 is comprised of a pair of housing halves, that is, a housing half 02 which is a part of an engine block and a housing half 03 which is a bearing cap (made of e.g. an iron alloy). A bearing retaining bore 05, 06 having a true-circular cross-sectional shape is formed by machining at a room temperature in the condition that the housing half 03 is mated to the housing half 02 by fastening bolts 04. Thereafter, during assembling of the bearing device, the bolts 04 are removed from the bearing housing 01, and then semi-cylindrical bearings 07, 08 which constitute the split-type sliding bearing are fitted along the inner surface 05, 06 of the bearing retaining bore. Then, the housing half 03 is mated to the housing half 02 by again fastening the bolts 04 (see FIG. 10).

With this configuration, the inner diameter (05) of the housing half 02 having a higher thermal expansion coefficient and made of an aluminum alloy becomes smaller than the inner diameter (06) of the housing half having a lower thermal expansion coefficient and made of an iron alloy due to a difference in thermal expansion coefficient between the housing half 02 made of an aluminum alloy and the housing half 03 made of an iron alloy during starting of the internal combustion engine in a cold district, even though no stepped difference is present at the inner surface 05, 06 of the bearing retaining bore 05, 06 between the abutting end faces of the pair of housing halves 02, 03, when the housing halves 02, 03 are mated with each other at a room temperature after the semi-cylindrical bearings 07, 08 are fitted in the bearing retaining bore (05, 06) between the housing halves, since the machining of the bearing retaining bore (05, 06) are carried out at a room temperature. Accordingly, a stepped difference (see reference mark "G" in FIG. 10) is caused due to a difference between degrees of thermal expansion, at the inner diameter of the bearing retaining bore (05, 06) between the circumferential end faces of the housing halves 02, 03 of the split-type bearing housing, resulting in occurrence of a stepped difference at the inner surface of the bearing between the abutting end faces of the semi-cylindrical bearings 07, 08 fitted between the housing halves 02, 03.

In recent years, an oil pump has been miniaturized in an internal combustion engine, and accordingly, the supply quantity of lubrication oil onto the inner surface of the sliding bearing for a crankshaft has been decreased. Accordingly, the bearing clearance between the inner surface of the sliding bearing for a crankshaft and the outer surface of the crankshaft is set to be small in order to reduce the amount of leakage of lubrication oil from the bearing clearance.

Furthermore, since the housing half on the engine block side made of an aluminum alloy has a thermal expansion coefficient which is larger than that of the crankshaft made of an iron alloy, the bearing clearance between the inner diameter of the pair of semi-cylindrical bearings fitted in the split-type bearing housing, and the crankshaft becomes extremely small during operation at a low temperature. Thus, if the stepped difference is caused between the circumferential end faces of the pair of semi-cylindrical bearings at the inner surface of the bearing, the ratio of the area of the stepped difference with respect to the cross-sectional area of the passage of the lubrication oil becomes larger during starting of the internal combustion engine in a cold district, in comparison with a conventional bearing clearance which has been set to be larger, resulting in occurrence of a wiping event which blocks the flow of the lubrication oil, and accordingly, the amount of leakage of lubrication oil is increased. Furthermore, the problem of inferior supply of lubrication oil onto the sliding surface of the bearing has been raised more and more.

Although JP-A-10-175131 proposes measures for comparatively decreasing the bearing clearance between the inner surface of the sliding bearing and the outer surface of the shaft in order to enhance the silence of the internal combustion engine, there is discussed no consideration as to the problem of occurrence of the stepped difference at the inner surface of the bearing between the abutting end faces of the pair of semi-cylindrical bearings which are fitted between the pair of housing halves constituting the split-type bearing housing and respectively having different thermal expansion coefficients, when the temperature of the split-type bearing housing is lowered in a cold district.

SUMMARY OF THE INVENTION

An object of the present invention is to solve the problem of occurrence of a wiping event as to the lubrication oil due to the presence of a stepped difference at the inner surface of a bearing between abutting end faces of a pair of semi-cylindrical bearings which constitute the sliding bearing and which are fitted between a pair of housing halves respectively having different thermal expansion coefficients and constituting a split-type bearing housing for a crankshaft in an internal combustion engine, during starting of the internal combustion engine under a low temperature condition (−30 deg. C.) in a cold district.

According to a first aspect of the present invention, there is provided a split-type sliding bearing for a crankshaft in an internal combustion engine, composed of a pair of semi-cylindrical bearings which are mated with each other to form a cylindrical body in use, and adapted to be fitted in a split-type bearing housing having a cylindrical bearing retaining bore which is bi-split so as to be aligned with the pair of semi-cylindrical bearings in the mated condition. The split-type bearing housing is comprised of a housing half having a higher thermal expansion coefficient, and a housing half having a lower thermal expansion coefficient. A first semi-cylindrical bearing which is one of the pair of semi-cylindrical bearings is supported on the housing half having a higher thermal expansion coefficient, and a second semi-cylindrical bearing which is the other one of the pair of semi-cylindrical bearings is supported on the housing half having a lower thermal expansion coefficient. They have the following dimensional relationship in a preinstalled condition:

(1) the first and second semi-cylindrical bearings have an equal outer diameter; and (2) the circumferential ends of the first semi-cylindrical bearing have a wall thickness which is set to be smaller than that of the circumferential ends of the second semi-cylindrical bearing.

Thereby, the inner surfaces of the first and second semi-cylindrical bearings are aligned with each other at the circumferential end faces of both semi-cylindrical bearings even though a stepped difference due to a difference between degrees of thermal contraction of the pair of housing halves is present at the inner diameter of the bearing retaining bore between the circumferential end faces of both housing halves during starting of the internal combustion engine under a low temperature condition in a cold district, in the condition that the pair of housing halves are mated with each other by fastening bolts after the first and the second semi-cylindrical bearings are fitted therebetween.

Explanation will be made of the above-mentioned alignment between the inner surfaces.

The alignment does not have the meaning of complete geometrical alignment between the inner surfaces of the semi-cylindrical bearings. The value that is a half of a difference between degrees of thermally contractive deformation of the inner diameter of the bearing retaining bore at the circumferential end faces of the pair of housing halves, which difference is obtained, for example, by a formula for calculating a thermally contractive deformation difference, during starting of the internal combustion engine under a low temperature (about −30 deg. C.) condition in a cold district, is set to a negative difference of the bearing wall thickness at the circumferential end faces of both housing halves, and in addition, errors determined by machining accuracy during manufacturing of the split-type sliding bearing and the split-type bearing housing are involved:

$$\Delta D = D \times (T2 - T1) \times (\alpha1 - \alpha2) \times K \quad (1)$$

where $\Delta D$ is a difference between degrees of thermally contractive deformation (mm), D is an inner diameter of bearing retaining bore (mm), T1 is a temperature during machining of a bearing retaining bore in the split-type bearing housing (deg. C.), T2 is a temperature of the split-type bearing housing during starting of the internal combustion engine in a cold district (deg. C.), $\alpha1$ is a thermal expansion coefficient of the split-type bearing housing on the high thermal expansion coefficient side (K⁻), $\alpha2$ is a thermal expansion coefficient of the split-type bearing housing on the low thermal expansion coefficient side (K⁻), and K is a relaxation coefficient of difference between the degrees of thermally contractive deformation by fastening bolts.

In a first embodiment of the sliding bearing according to the present invention, the second semi-cylindrical bearing has a wall thickness which is uniform over the entire circumferential thereof.

In a second embodiment of the sliding bearing according to the present invention, the second semi-cylindrical bearing has a wall thickness which is increased from the circumferential center to the circumferential end faces thereof.

In a third embodiment of the sliding bearing according to the present invention, the first semi-cylindrical bearing has a wall thickness which is uniform over the entire circumferential length thereof.

In a fourth embodiment of the sliding bearing, the first semi-cylindrical bearing has a wall thickness which is decreased from the circumferential center to the circumferential end faces thereof.

In a fifth embodiment of the sliding bearing according to the present invention, the first and second semi-cylindrical bearings have multi circumferential grooves formed on the inner surfaces thereof and extended circumferentially thereof. The circumferential grooves formed in circumferential end zones including respectively two circumferential end faces of the first and second semi-cylindrical bearings have a depth of 5 to 20 μm.

In a sixth embodiment of the sliding bearing according to the present invention, the circumferential end zones of the inner surfaces of the semi-cylindrical bearing is defined by a circumferential length which corresponds to a circumferential angle of at least 10 deg. but 50 deg. at maximum, measured from the circumferential end faces as a stating point.

In a seventh embodiment of the sliding bearing according to the present invention, the inner surfaces of the semi-cylindrical bearing have a degree of surface roughness, which is not greater than 3.2 μmRz, except the circumferential end zones.

In an eighth embodiment of the sliding bearing according to the present invention, the circumferential grooves have pitches of 0.3 to 1.5 mm.

In a ninth embodiment of the sliding bearing according to the present invention, the depth of the circumferential grooves formed on the inner surfaces of the first and second semi-cylindrical bearings is equal to or greater than the degree of stepped difference caused between the circumferential end faces of the first and second semi-cylindrical bearings.

According to a second aspect of the present invention, there is provided a split-type sliding bearing device for a crankshaft in an internal combustion engine. The device comprises:

a split-type sliding bearing for a crankshaft in an internal combustion engine, comprised of a pair of semi-cylindrical bearings which are mated with each other to form a cylindrical body in use, and a split-type bearing housing for a crankshaft in an internal combustion engine, having a cylindrical bearing retaining bore which is bi-split so as to be aligned with the pair of semi-cylindrical bearings in the mated condition, for accommodating and retaining the pair of semi-cylindrical bearings in the bearing retaining bore. The split-type bearing housing is comprised of a housing half having a higher thermal expansion coefficient, and a housing half having a lower thermal expansion coefficient. A first semi-cylindrical bearing which is one of the pair of semi-cylindrical bearings is supported on the housing half having a higher thermal expansion coefficient, and a second semi-cylindrical bearing which is the other one of the pair of semi-cylindrical bearings is supported on the housing half having a lower thermal expansion coefficient. They have the following dimensional relationship in a preinstalled condition:

(1) the first and second semi-cylindrical bearings have an equal outer diameter, and (2) the circumferential ends of the first semi-cylindrical bearing have a wall thickness which is set to be smaller than that of the circumferential ends of the second semi-cylindrical bearing.

Thereby, the inner surfaces of the first and second semi-cylindrical bearings are aligned with each other at the circumferential end faces of both semi-cylindrical bearings even though a stepped difference due to a difference between degrees of thermally contraction of both housing halve is present at the inner diameter of the bearing retaining bore between the circumferential end faces of the pair of housing halves during stating of the internal combustion engine under a low temperature condition in a cold district, in the condition that both housing halves are mated with each other by fastening bolts after the first and second semi-cylindrical bearings are fitted therebetween.

The split-type bearing housing for a crankshaft in an internal combustion engine, according to the present invention, is comprised of a pair of housing halves having thermal expansion coefficients that are different from each other, and the split-type sliding bearing is fitted in the split-type bearing housing. Substantially no stepped difference is caused between the circumferential end faces of the pair of semi-cylindrical halves fitted in the bearing retaining bore, different from a conventional split-type sliding bearing, even though a difference in thermal contraction between the pair of semi-cylindrical bearings is present at the inner diameter of the bearing retaining bore so as to cause the stepped difference (refer to reference mark "G" in FIG. 10) during starting of the internal combustion engine under a low temperature condition in a cold district, in the condition that the semi-cylindrical bearings are fitted between the pair of bearings. It is because the wall thickness of the circumferential ends of the semi-cylindrical bearing fitted in the housing half having a high thermal expansion coefficient is set to be smaller than that of the circumferential ends of the semi-cylindrical bearing fitted in the housing half having a low thermal expansion coefficient, and by selecting a difference between the wall thickness, a stepped difference caused between the circumferential end faces of the pair of housing halves can be substantially offset.

Furthermore, the pair of semi-cylindrical bearings is provided with multi circumferential grooves which are extended circumferentially thereof, and which are formed in the inner surfaces thereof within the circumferential end zones, having a depth in a range from 5 to 20 μm. With this configuration, even though a stepped difference having a size of 5 μm at maximum is caused at the inner surface of the bearing, the depth of the circumferential grooves is equal to or larger than the size of the stepped difference, and accordingly, the lubrication oil flowing in the rotating direction of the crankshaft can smoothly flow into and through the circumferential grooves without being hindered by the stepped difference caused between the circumferential end faces of the semi-cylindrical halves. Thus, occurrence of a wiping event as to the lubrication oil, which is incurred by the stepped difference caused at the circumferential end faces of the semi-cylindrical bearing, can be prevented in success.

Explanation will be made below of preferred embodiments of the present invention with reference to the accompanying drawings.

DETAILED DESCRIPTION OF THE INVENTION

Embodiment 1

Figure 1:
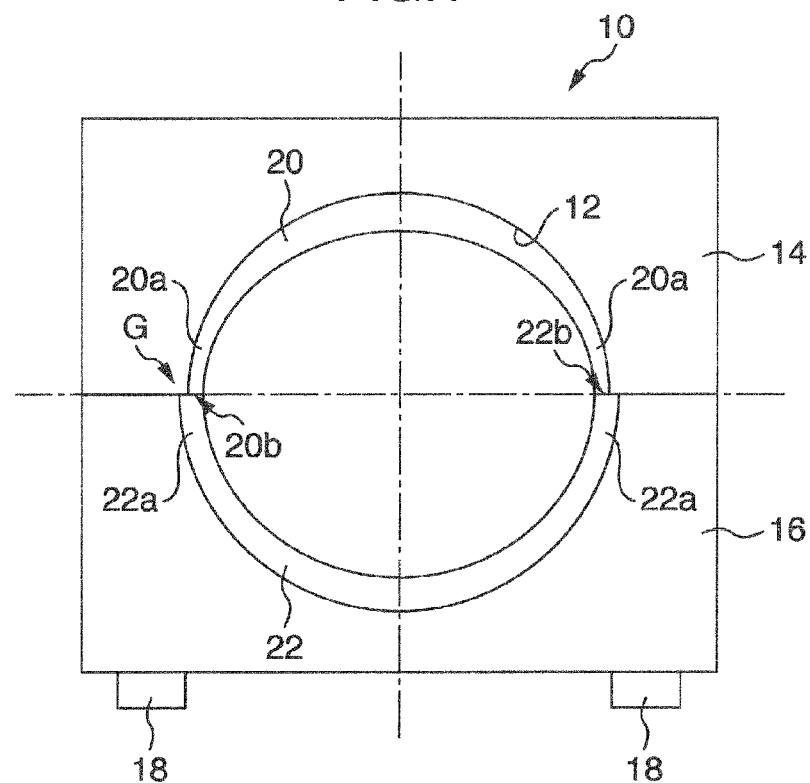
FIG. 1 is a front view illustrating a split-type sliding bearing for a crankshaft in an internal combustion engine, in an embodiment 1 of the present invention, which is fitted in a split-type bearing housing comprised of housing halves having different thermal expansion coefficients from each other, during starting of the internal combustion engine in a cold district.

FIG. 1 is a front view showing a split-type sliding bearing comprised of a pair of semi-cylindrical bearings 20, 22 and fitted in a bearing retaining bore 12 in a split-type bearing housing 10 for a crankshaft of an internal combustion engine. The split-type bearing housing 10 is comprised of a housing half 14 having a higher thermal expansion coefficient which is a part of an engine block made of an aluminum alloy, and a housing half 16 having a lower thermal expansion coefficient which is a bearing cap made of iron alloy. The pair of housing halves 14, 16 is integrated by fastening bolts 18. The bearing retaining bore 12 in the split-type housing 10 is a cylindrical bore having a true-circular cross-sectional shape, which is formed by machining the split-type bearing housing in the condition that the housing halves 14, 16 are integrally mated with each other by fastening the bolts 18 without fitting therein the split-type sliding bearing.

The split-type bearing housing 10 is disassembled after the bearing retaining bore 12 is formed by machining as stated above, and then the semi-cylindrical bearings 20, 22 are fitted respectively in the inner surfaces of the housing halves. The housing halves 14, 16 are again assembled by fastening the bolts 18 in an integrally mated condition as shown in FIG. 1.

It is assumed that the split-type bearing housing 10 shown in FIG. 1 falls in a low temperature condition at about −30 deg. C. in a cold district. Accordingly, the degree of thermally contractive deformation of the circumferential ends of the housing half 14 having a higher thermal expansion coefficient is larger than that of the housing half 16 having a lower thermal expansion coefficient. As a result, a stepped difference (G) is caused between the circumferential end faces of both housing halves 14, 16, as shown in FIG. 10.

The semi-cylindrical bearings 20, 22 to be fitted in the bearing retaining bore 12 in the split-type bearing housing 10 have outer diameters which are equal to each other, and wall thickness at the circumferentially center parts thereof, which are equal to each other, in the initial condition that is before they are fitted in the split-type bearing housing. The wall thicknesses of the semi-cylindrical bearings 20, 22 are largest in their circumferential center parts thereof and are smaller toward the circumferential ends thereof. Furthermore, the wall thicknesses of the circumferential ends 20a, 22a of the semi-cylindrical bearings are formed such that the wall thickness of the circumferential ends 20a is smaller than that of the circumferential end 22a.

Figure 10:
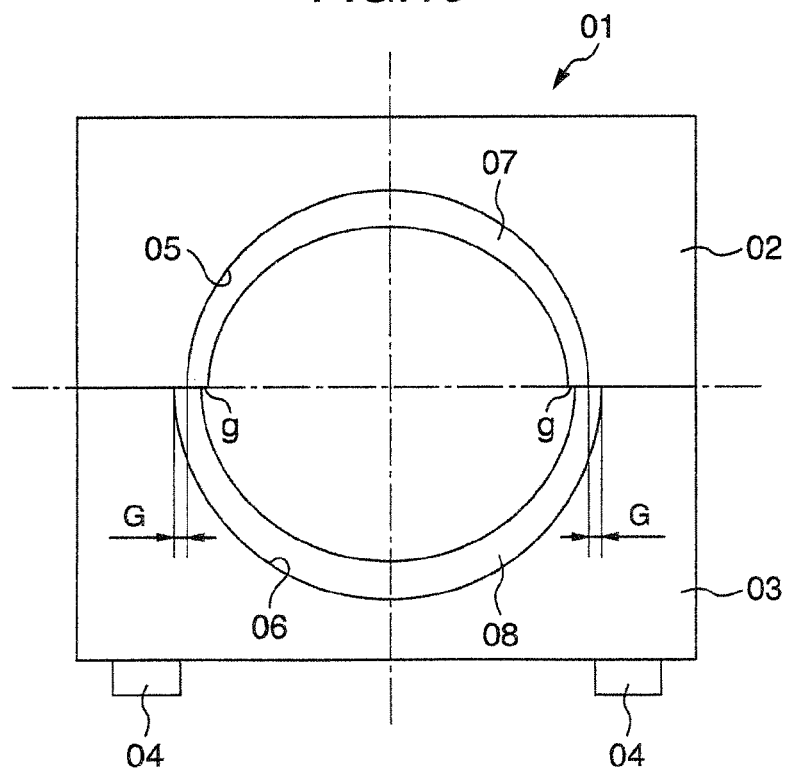
FIG. 10 is a view for explaining a conventional example, illustrating the split-type bearing housing shown in FIG. 9, in which a split-type sliding bearing comprised of a pair of semi-cylindrical bearings is fitted.

Since the stepped difference (G) is caused, as shown in FIG. 10, between the circumferential end faces of the pair of housing halves 14, 16 in the low temperature condition at −30 deg. C., there would be possibly caused a stepped difference (g) at the inner surface of the bearing between the circumferential end faces of the pair of semi-cylindrical bearings if the circumferential ends of the pair of semi-cylindrical bearings have wall thicknesses which are equal to each other. However, in this embodiment, it is designed that the outer diameters of the pair of semi-cylindrical bearings 20, 22 are equal to each other in an initial condition while the wall thickness of the circumferential ends 20a is smaller than the wall thickness of the circumferential ends 22a, and the inner surfaces of both semi-cylindrical bearings 20, 22 are aligned with each other. Thus, no stepped difference is caused at the inner surface of the bearing between the circumferential ends 20b, 22b, as shown in FIG. 1. Accordingly, a wiping event (scraping effect) of the lubrication oil can hardly occur at the circumferential end faces 20b, 22b of the pair of semi-cylindrical bearings 20, 22.

In order to actually align the inner surfaces of the pair of semi-cylindrical bearings 20, 22 with each other as stated above, there may be used the split-type bearing housing 10 itself (the cylinder block and the bearing cap) or a model which is a part of the split-type bearing housing and is formed so as to mimic the split-type bearing housing.

The split-type bearing housing comprised of housing halves which are mated with each other by fastening bolts is cooled down to about −30 deg. C. on the assumption of a low temperature condition in a cold district, and difference of the diameter of the bearing retaining bore between the split surfaces of the split-type bearing housing (the circumferential end faces of the pair of split-type bearing housing halves) is measured at that time with the use of a measuring unit, such as a roundness measuring instrument.

The wall thickness of the circumferential ends of the semi-cylindrical bearing fitted in the housing half having a higher thermal expansion coefficient is set to be smaller than that of the circumferential ends of the semi-cylindrical bearing fitted in the housing half having a lower thermal expansion coefficient, by a degree which is equal to the measured value of the stepped difference.

Alternatively, as a convenient manner, a difference between degrees of thermally contractive deformation in the inner diameter of the bearing retaining bore in the split-type bearing housing is calculated with the use of the formula (1) as stated above, and the wall thickness of the circumferential ends of the semi-cylindrical bearing fitted in the housing half having a higher thermal expansion coefficient may be set smaller than that of the circumferential ends of the semi-cylindrical bearing fitted in the housing half having a lower thermal expansion coefficient, by a value which is a half of the difference calculated as stated above.

The inner diameter (D mm) of the bearing retaining bore is a size at the temperature (T1 deg. C.) during machining of the bearing retaining bore in the split-type bearing housing, and the machining of the bearing retaining bore is usually carried out in a room temperature (about 25 deg. C.). Furthermore, the temperature (T2 deg. C.) of the split-type bearing housing may be set to −30 deg. C., while it depends upon a type of an internal combustion engine, since the lowest temperature at which the starting of an internal combustion engine in a usual passenger vehicle is assured is set to about −30 deg. C. Since the housing halves having thermal expansion coefficients which are different from each other are mated with each other by fastening bolts, a compressive stress is induced at the abutting end faces of the housing halves, normal to the abutting end faces. Accordingly, the abutting end faces of the housing half having a lower thermal expansion coefficient exerts a resistance against the thermally contractive deformation of the abutting end faces of the housing half having a higher thermal expansion coefficient. In the case of the combination of the housing halves which are respectively made of an aluminum alloy and an iron alloy having thermal expansion coefficients which are relatively different from each other, the difference between thermally contractive deformation in the inner diameter of the bearing retaining bore at the split surfaces of the split-type bearing housing is reduced to about ⅓ of the difference between thermally contractive deformations of the respective housing halves in a free condition. (Relaxation Coefficient of Thermally Contractive Deformation K=⅓)

Calculation Example

A bearing retaining bore having an inner diameter of 60 mm is formed in a split-type bearing housing in which a housing half made of an aluminum alloy (the thermal expansion coefficient of which is $23 \times 10^{-6}$ (K$^{-1}$)) and a housing half made of an iron alloy (the thermal expansion coefficient of which is $12 \times 10^{-6}$ (K$^{-1}$)) are mated with each other by fastening bolts made of an iron alloy. If the temperature during machining of the bearing retaining bore is 25 deg. C., and the temperature of the split-type bearing housing is −30 deg. C. during a starting of the internal combustion engine in a cold district, the thermally contractive deformation difference=60 mm×(25 deg. C.−(−30 deg. C.)×($23 \times 10^{-6}$(K$^{-1}$)−$12 \times 10^{-6}$(K$^{-1}$))×⅓=0.012 mm is obtained.

The wall thickness of the circumferential ends of the semi-cylindrical bearing fitted in the housing half having a higher thermal expansion coefficient is set to be smaller than that of the circumferential ends of the semi-cylindrical bearing fitted in the housing half having a lower thermal expansion coefficient by 0.006 mm which is a half of the above-mentioned thermally contractive deformation difference 0.012 mm.

It is noted here that the meaning of the wording "the inner surface of the pair of semi-cylindrical bearings are aligned with each other" are explained above. Machining errors are inevitably caused during machining of the inner diameters of both semi-cylindrical bearings and housing halves, and as well, a slight deviation is caused between the abutting end faces of the pair of housing halves when both housing halves are mated with each other by fastening bolts after the semi-cylindrical bearings are fitted therebetween. Thus, the above-mentioned wording "the alignment of the inner surfaces" should allow occurrence of a stepped difference within 5 μm between the abutting end faces of the pair of the semi-cylindrical bearings, on one of both sides thereof. That is, it can be said that the stepped difference within 5 μm (that is, ±5 μm) in the radial direction falls in the above-mentioned alignment condition.

In this embodiment, the explanation is made with reference to the most generic type split-type sliding bearing for an internal combustion engine, in which each of the pair of semi-cylindrical bearings has the wall thickness which is largest in the circumferential center thereof and is decreased toward the circumferential end faces thereof, although the present invention should not be limited to this split-type sliding bearing. According to the present invention, any of following types may be used as far as the inner surfaces of the pair of semi-cylindrical bearings are aligned with each other at the opposite circumferential end faces during starting of the internal combustion engine at a low temperature of about −30 deg. C. in the condition that the pair of semi-cylindrical bearings are fitted in the split-type bearing housing: the wall thickness of each of the semi-cylindrical bearings is uniform over the entire circumferential length thereof; the wall thickness thereof is smallest at the circumferential center, and is increased toward the circumferential end faces thereof; or the inner surface of each of both semi-cylindrical bearings is formed therein with a plurality of circular-arc surfaces having different curvatures. Alternatively, a pair of semi-cylindrical bearings may be of different types from each other.

Figure 2:
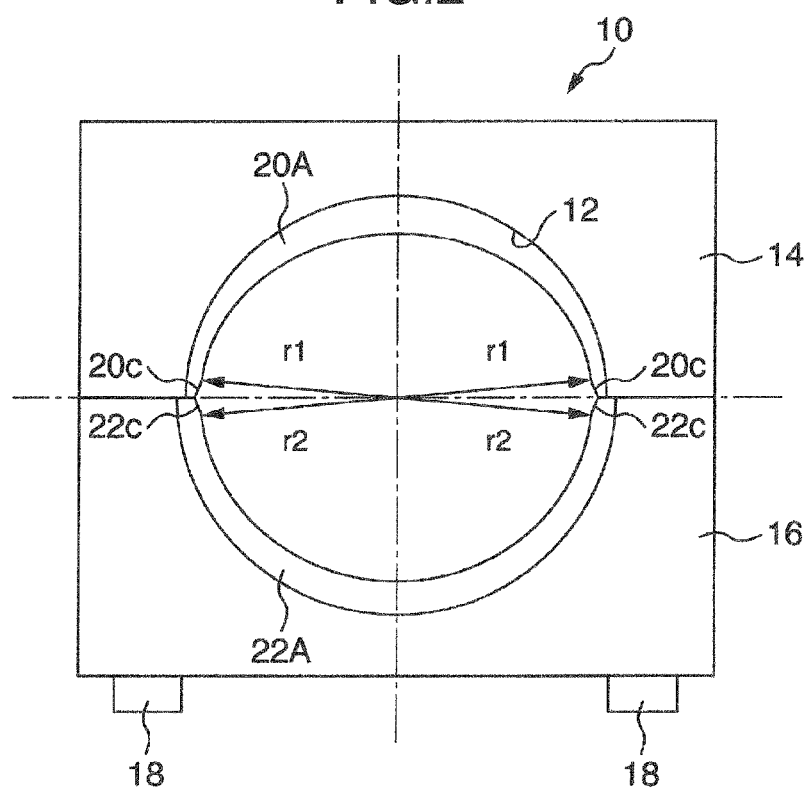
FIG. 2 is a view similar to FIG. 1 in the condition that the split-type sliding bearing shown in FIG. 1 is formed therein with crush relieves.
Figure 1A:
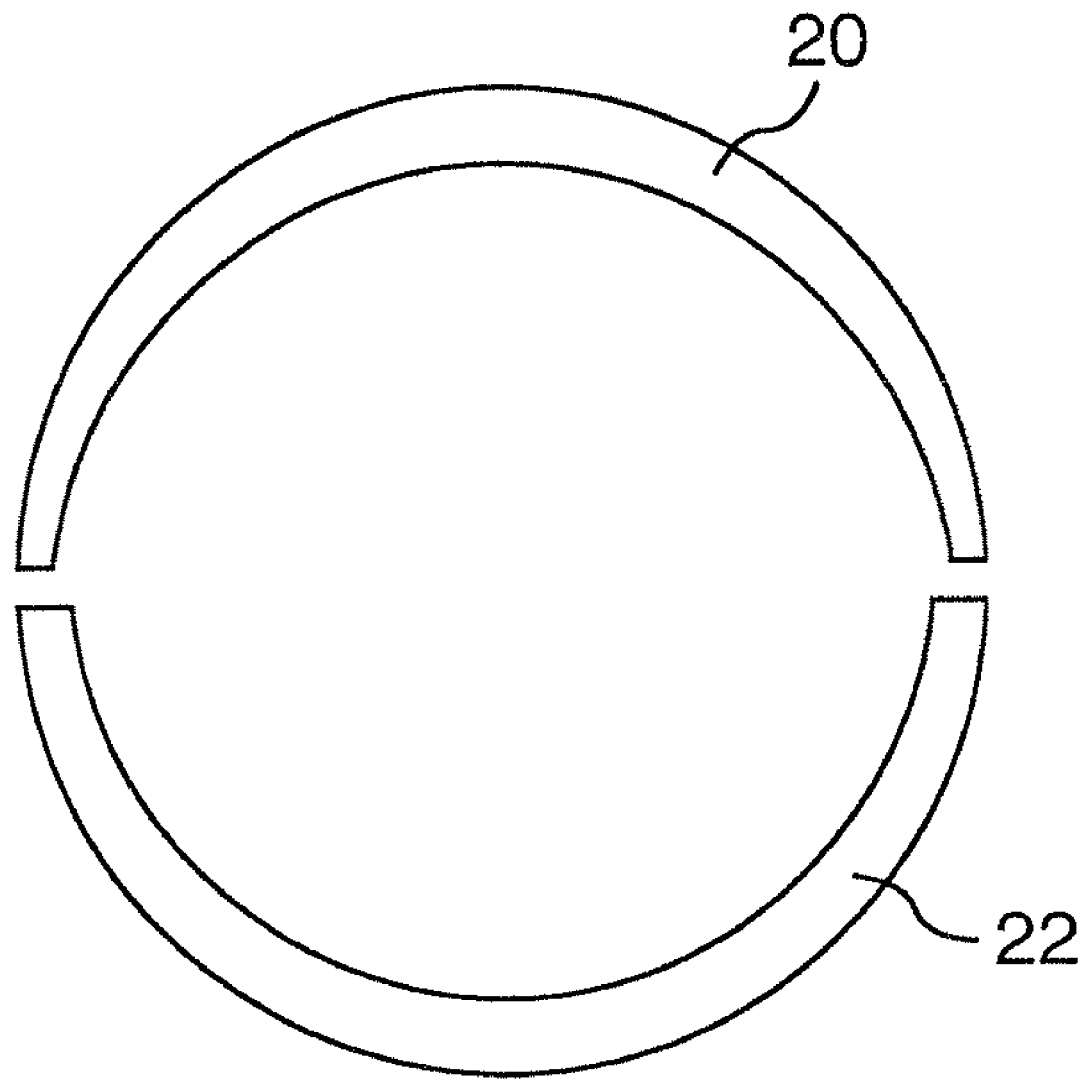
FIG. 1a is a view showing first and second semi-cylindrical bearing parts in a preinstalled condition.

Similar to conventional semi-cylindrical bearings, the semi-cylindrical bearings 20A, 22A may have crush relieves (20c, 22c, the inner diameter increasing parts) in the circumferential ends of the semi-cylindrical bearings 20A, 22A on the inner side thereof (see FIG. 2). In the case of the provision of the crush relieves, the radiuses (r1, r2) are measured, from the center of the bearing, at positions on the inner surfaces of the semi-cylindrical bearings fitted respectively in the hosing half having a higher thermal expansion coefficient and the housing half having a lower thermal expansion coefficient, which are directly adjacent to the crush relieve forming zones, and may be set to be equal to each other (r1=r2 in FIG. 2).

Embodiment 2

Figure 3:
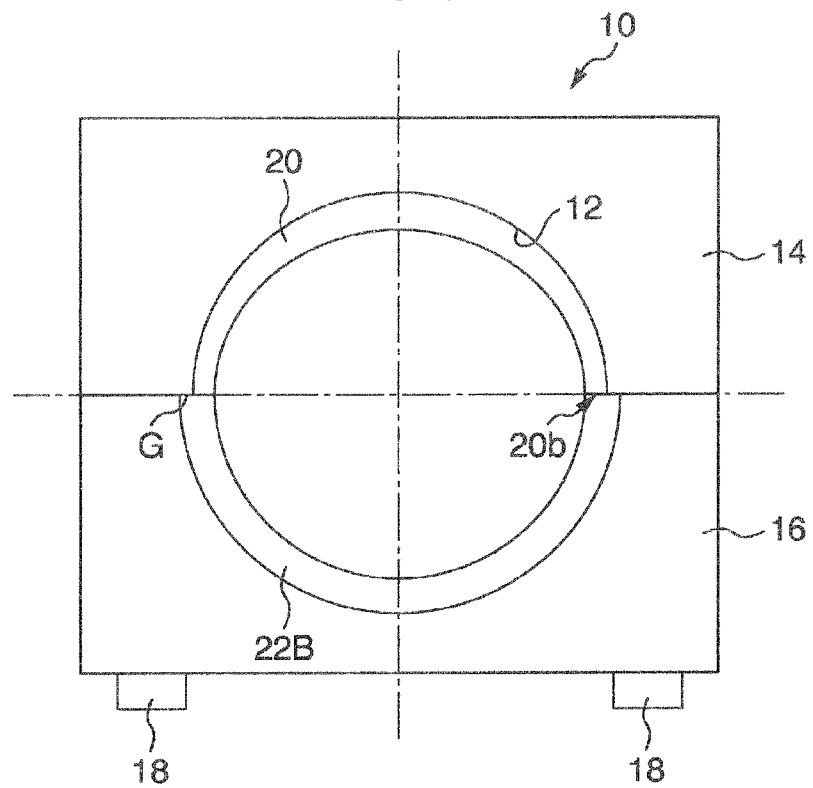
FIG. 3 is a front view illustrating a split-type sliding bearing for a crankshaft in an internal combustion engine, in an embodiment 2 of the present invention, which is fitted in a split-type bearing housing comprised of housing halves having different thermal expansion coefficients from each other, during starting of the internal combustion engine in a cold district.

Explanation of an embodiment 2 will be made below referring to FIG. 3. In this embodiment, the same split-type bearing housing 10 as that explained in the embodiment 1 is used, and a semi-cylindrical bearings 20 having a wall thickness which is largest at the circumferential center thereof and is decreased toward the circumferential end faces 20b thereof is fitted in a housing half 14 having a higher thermal expansion coefficient and made of an aluminum alloy, and a semi-cylindrical bearing 22B having a wall thickness uniform over the entire circumferential length is fitted in a housing have having a lower thermal expansion coefficient. FIG. 3 shows the condition that the circumferential end faces of the pair of semi-cylindrical bearings are aligned with each other during starting of the internal combustion engine at a low temperature of about −30 deg. C. in a cold district.

The wall thicknesses of the circumferential ends of the semi-cylindrical bearings 20, 22B are different from each other, and accordingly the inner surfaces of both semi-cylindrical bearings 20, 22B are aligned with each other at the circumferential end faces thereof without stepped difference being present between the inner surfaces of both semi-cylindrical bearings 20, 22B, although a stepped difference "G" is present in the bearing retaining bore 12 in the split-type bearing housing 10.

The crankshaft (not shown) in the internal combustion engine is made of an iron alloy in general and accordingly, has a thermal expansion coefficient which is substantially equal to the housing half having a lower thermal expansion coefficient and made of an iron alloy. Thus, the semi-cylindrical bearing 22B having a wall thickness which is uniform over the entire circumferential length thereof is fitted in the housing half 16 having a lower expansion coefficient, while the semi-cylindrical bearing 20 (which is the same as the semi-cylindrical bearing 20 explained in the embodiment 1 as shown in FIG. 1) having a wall thickness which is greatest at the circumferential center thereof and is decreased toward the abutting end faces thereof is fitted in the housing half 14 having a lower thermal expansion coefficient. Both halves 14, 16 are then mated with each other by fastening bolts. FIG. 3 shows the inner surfaces of the pair of semi-cylindrical bearings 20, 22B are aligned with each other at the circumferential end faces thereof. With this configuration, the inner surface of the semi-cylindrical bearing 22B fitted in the housing half 16 having a lower thermal expansion coefficient and the outer surface of a shaft to be supported define therebetween a bearing clearance which can be set to be small over the entire peripheral surface of the semi-cylindrical bearing 22B. Thereby, it is possible to effectively prevent occurrence of leakage of lubrication oil. It is noted in this case that no specific limitation is applied to the configuration of the semi-cylindrical bearing 20 fitted in the housing half 14 having a higher thermal expansion coefficient as far as the inner surfaces are aligned with each other at the abutting end faces. However, in order to set the bearing clearance to be small at the circumferential center of the bearing where the silence is greatly affected during operation of the internal combustion engine, the semi-cylindrical bearing having a wall thickness which is greatest at the circumferential center and is decreased toward the circumferential end faces (abutting end faces) is preferably used.

Embodiment 3

Explanation of an embodiment 3 will be made below referring to FIG. 4. A split-type bearing housing comprised of a pair of housing halves 14, 16 are fastened by bolts 18, as stated above. If stiffness of the housing half 16 having a lower thermal expansion coefficient is relatively low, the inner diameter of the bearing retaining bore of the housing half 16 having a lower thermal coefficient is enlarged due to a stress induced by fastening bolts in a direction along the circumferential end faces of the housing halves 14, 16 constituting the split-type bearing housing 10, while the bearing retaining bore therein is elastically deformed into an elliptic shape having the inner diameter which is relatively smaller in a direction perpendicular to the virtual plane including the circumferential end faces of the housing half 14, 16. In this case, the bearing clearance between the inner diameter of the semi-cylindrical bearing fitted in the housing half 16 having a lower thermal expansion coefficient and the outer peripheral surface of the crankshaft as a shaft to be supported is gradually increased toward the circumferential end faces of the semi-cylindrical bearing, and accordingly the amount of leakage of lubrication oil from the enlarged parts of the bearing clearance become larger. As counter measures to this problem, in this embodiment, the wall thickness of the semi-cylindrical bearing 22C fitted in the housing half 16 having a lower thermal expansion coefficient is gradually increased from the circumferential center to the circumferential end faces thereof, while the wall thickness of the semi-cylindrical bearing 20B fitted in the housing half 14 having a higher thermal expansion coefficient is uniform over the entire circumferential length thereof. With this configuration, the bearing clearance can be maintained to be smaller over the entire peripheral surfaces of the semi-cylindrical bearings 20B, 22C.

Figure 4:
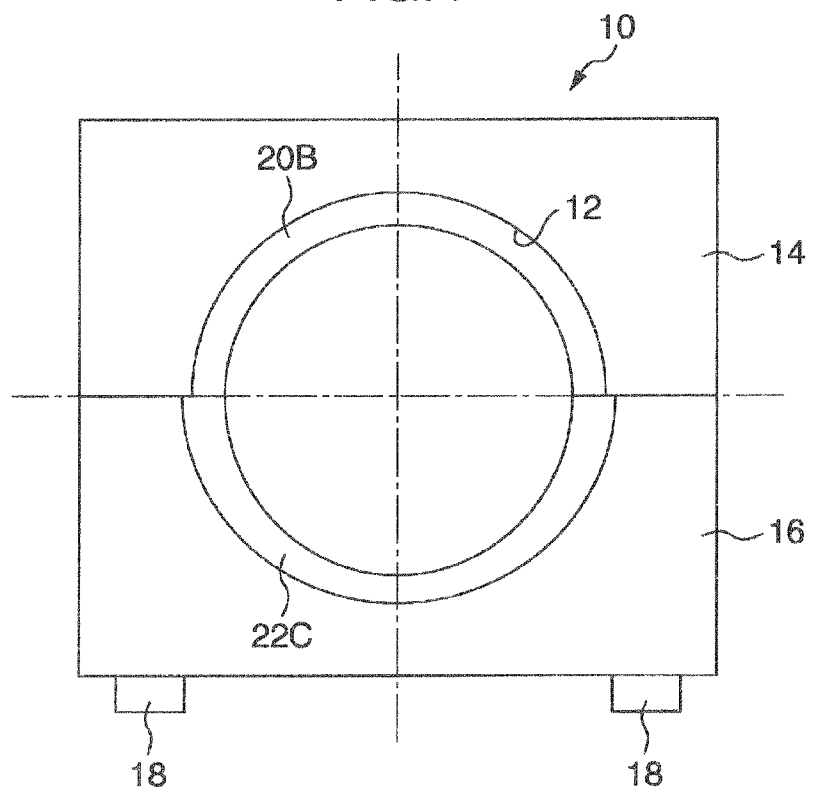
FIG. 4 is a front view illustrating a split-type sliding bearing for a crankshaft in an internal combustion engine, in an embodiment 3 of the present invention, which is fitted in a split-type bearing housing comprised of housing halves having different thermal expansion coefficients from each other, during starting of the internal combustion engine in a cold district.

Different from the configuration as shown in FIG. 4, the semi-cylindrical bearing fitted in the housing half 14 having a higher thermal expansion coefficient may be also formed into the configuration that the wall thickness thereof is increased from the circumferentially center to the circumferential end faces thereof, similar to the semi-cylindrical bearing 22C fitted in the housing half 16 having a lower thermal expansion coefficient.

However, in the case of the split-type sliding bearing for the use in the cold district, according to the present invention, it is noted that even in either of the above-mentioned cases, the wall thickness of the circumferential ends of the semi-cylindrical bearing fitted in the housing half 14 having a high thermal expansion coefficient should be set to be smaller than that of the circumferential ends of the semi-cylindrical bearing fitted in the housing halve 16 having a lower thermal expansion coefficient in order to align the inner surfaces of the pair of semi-cylindrical bearings without stepped difference during starting of the internal combustion engine at a low temperature.

Embodiment 4

Explanation of an embodiment 4 will be made below referring to FIG. 5. In this embodiment, the wall thickness of the circumferential ends of a semi-cylindrical bearing 20C fitted in the housing half 14 having a higher thermal expansion coefficient and made of an aluminum alloy is larger than that of the circumferential ends of a semi-cylindrical bearing 22D fitted in the housing half 16 having a low thermal expansion coefficient and made of an iron alloy so as to align the inner surfaces of the pair of semi-cylindrical bearings 20C, 22D with each other at the abutting end faces thereof during starting of the internal combustion engine at a low temperature. The dimensional relationship between the semi-cylindrical bearings 20C, 20D is the same as that explained in the embodiment 2 shown in FIG. 3.

However, during manufacturing of the semi-cylindrical bearings and during machining of the bearing retaining bore in the split-type bearing housing, machining errors are inevitably caused, and furthermore a slight positional deviation is caused between the abutting end faces of the pair of housing halves when the split-type bearing housing is fastened with bolts after the semi-cylindrical bearings are fitted in the split-type bearing housing. Thus, a stepped difference (g) of about 5 μm at maximum would be possibly caused between the abutting end faces (circumferential end faces) of the pair of the semi-cylindrical bearings at one end when the internal combustion engine in a low temperature condition is started in a cold district.

Figure 5:
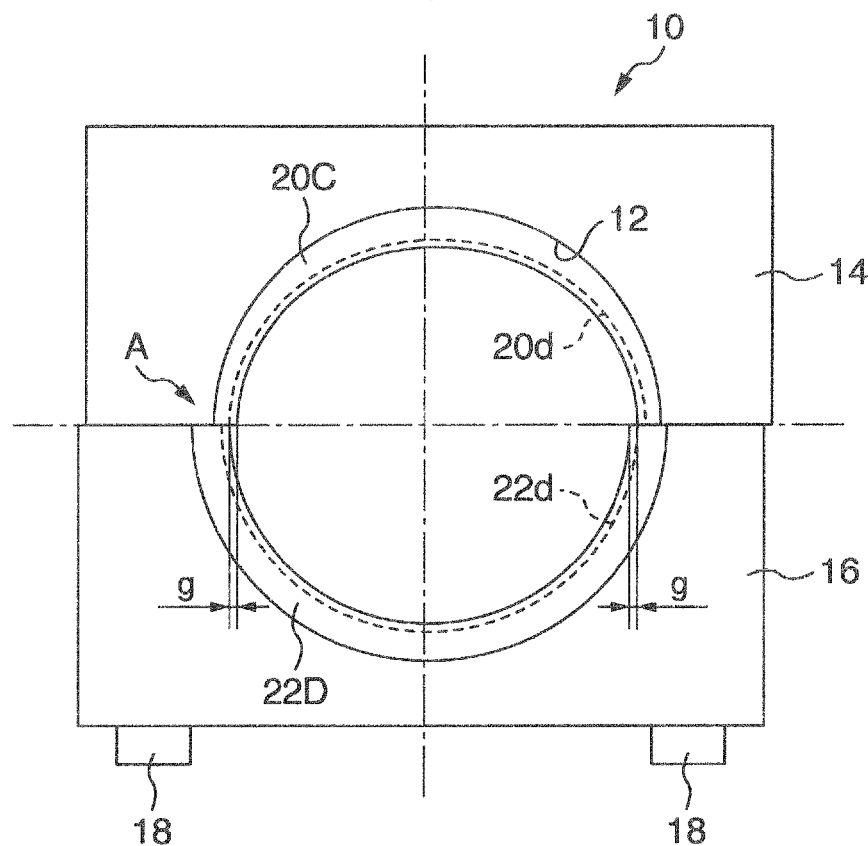
FIG. 5 is a front view illustrating a split-type sliding bearing for a crankshaft in an internal combustion engine, in an embodiment 4 of the present invention, which is fitted in a split-type bearing housing comprised of housing halves having different thermal expansion coefficients from each other, during starting of the internal combustion engine in a cold district.
Figure 7:
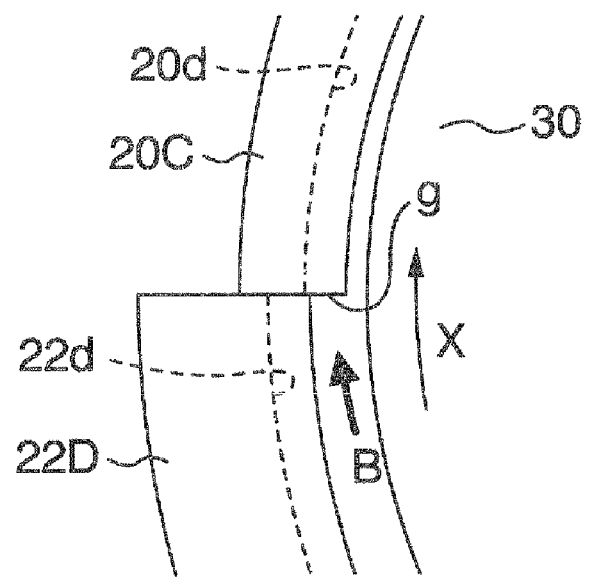
FIG. 7 is an enlarged view illustrating a portion shown in FIG. 5, in which a stepped difference is formed.

FIG. 5 shows the condition that the stepped difference (g) is caused between the inner surfaces of the housing halves 14, 16 at the abutting end faces thereof since a positional deviation is caused at the abutting end surfaces of the housing halves 14, 16 (the split surfaces of the split-type bearing housing) when the housing halves 14, 16 are mated with each other by fastening the bolts. FIG. 7 is an enlarged view illustrating the portion "A" shown in FIG. 5, in which the stepped difference is caused between the inner surfaces of the semi-cylindrical bearings 20C, 20D at the circumferential end faces thereof, and also illustrating a crankshaft 30.

Figure 8:
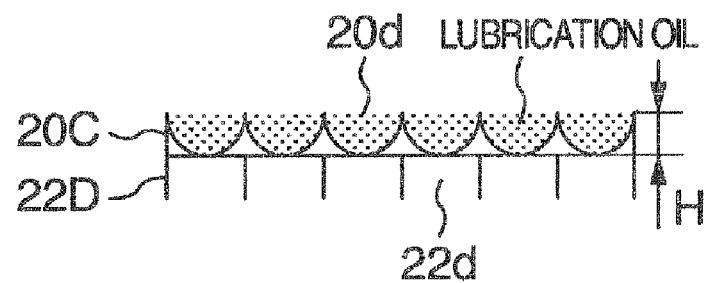
FIG. 8 is a view illustrating a cross-sectional shape of circumferential grooves formed in the inner surface of the semi-cylindrical bearing constituting the split-type sliding bearing explained in the embodiment 4, as viewed at the circumferential end face of the semi-cylindrical bearing.
Figure 9:
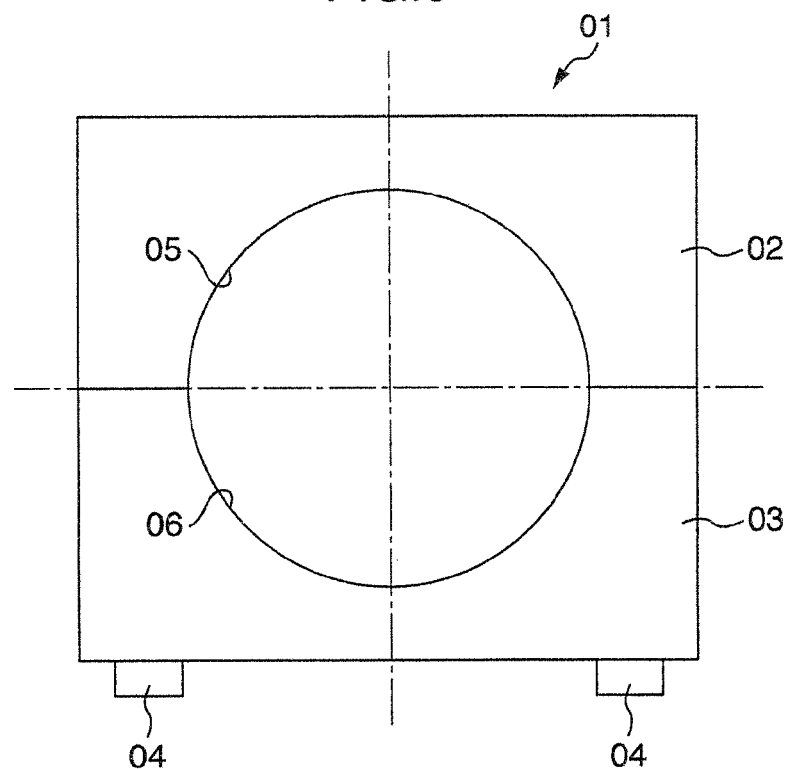
FIG. 9 is a view for explaining a conventional example, illustrating a split-type bearing housing comprised of a pair of housing halves having different thermal expansion coefficients from each other in an assembled condition.

The semi-cylindrical bearings 20C, 20D have multi circumferential grooves 20d, 22d formed in the inner surfaces thereof. The circumferential grooves 20d, 22d preferably have a circular-arc cross-sectional shape as shown in FIG. 8 in which H denotes the depth of the circumferential grooves 20d, 22d. As the stepped difference (g) which is a part of the abutting end face of the semi-cylindrical bearing 20C is viewed in the direction indicated by the arrow "B" in FIG. 7, the cross-sectional shape of the circumferential grooves can been seen in FIG. 8 such as it opens at the abutting end face. FIG. 8 also shows the lubrication oil flowing through the circumferential grooves 20d.

The circumferential grooves having a depth of 5 to 20 μm are formed in the inner surfaces of the semi-cylindrical bearings 20C, 22D in this embodiment, which depth is equal to or greater than the size of the stepped difference (g). Thus, even though the stepped difference (g) having a size of about 5 μm is generated between the circumferential end faces of the semi-cylindrical bearings 20C, 22D, the lubrication oil flowing in the rotating direction of the crankshaft (see the arrow "X" in FIG. 7) can smoothly flow into and through the circumferential grooves 20d without being hindered by the stepped difference (g). Thereby, it is possible to successfully prevent occurrence of a wiping event as to the lubrication oil by the stepped difference (g).

On the contrary, in the case where no circumferential grooves are formed in the inner surfaces of the semi-cylindrical bearings, the stepped difference caused between the circumferential end faces of the semi-cylindrical bearings becomes a barrier blocking the path of the lubrication oil flowing in the rotating direction "X" of the crankshaft, resulting in occurrence of a wiping event as to the lubrication oil by the stepped difference. As a result, the lubrication oil which has come to the position of the stepped difference can readily flow widthwise of the bearing (the axial direction) along the stepped difference, and accordingly sufficient lubrication cannot be assured.

The explanation is made that the depth "H" of the circumferential grooves is set to be not greater than 20 μm. The reason why the depth H is limited to the above-mentioned value is that, when the depth exceeds 20 μm, an oil film could be hardly formed on the sliding surface in the circumferential center of the semi-cylindrical bearing, which mainly bears dynamic load during operation of the internal combustion engine. The depth of the circumferential grooves is more preferably in a range from 10 to 15 μm.

Furthermore, the circumferential grooves 20d, 22d formed in the inner surfaces of the semi-cylindrical bearings have pitches set to 0.3 to 1.5 mm widthwise of the bearing. It is because, when the pitches of the circumferential grooves be smaller than 0.3 m, the sectional area of each of the crests of ridges which define therebetween the circumferential grooves becomes excessively small so that the crests would be readily worn in contact with the crankshaft and the bearing clearance is increased. Accordingly, the amount of leakage of lubrication oil would be increased. When the pitches of the circumferential grooves exceed 1.5 mm, the number of ridges which bear a load from the crankshaft would be smaller in a width direction of the semi-cylindrical bearing so that a load received by each of the crests would become higher, and accordingly the material strength of the semi-cylindrical bearing would be lowered by a frictional heat, resulting in an increased degree of abrasion. The pitches of the circumferential grooves are more preferably in a range from 0.5 to 1.2 mm in a width direction of the semi-cylindrical bearing in order to reduce the abrasion of the semi-cylindrical bearings.

Although the circumferential grooves 20d, 22d of the semi-cylindrical bearings 20C, 22D are formed over the entire peripheral surfaces thereof, they may be formed only in a range of a circumferential length corresponding to a predetermined circumferential angle measured from the circumferential end face of the semi-cylindrical bearing 20C on the side where a stepped difference (g) presents which faces in the direction opposite to the rotating direction of the crankshaft.

The circumferential grooves 20d, 22d preferably have a circular-arc cross-sectional shape while a V-like cross-sectional shape is also preferable as shown in FIG. 8.

If the circumferential grooves have a circular-arc cross-sectional shape, not less than about ⅔ of the area of the stepped difference, which is a part of the abutting face of the semi-cylindrical bearing body, is occupied by the space of the circumferential grooves through which the lubrication oil flows. That is, there can be obtained the technical advantages equivalent to the case where the stepped difference is reduced to substantially not greater than ⅓.

If the circumferential grooves have a V-like cross-sectional shape, not less than about ½ of the area of the stepped difference, which is a part of the abutting surface of the semi-cylindrical bearing, is occupied by the space of the circumferential grooves through which the lubrication oil flows. That is, there can be obtained the technical advantages equivalent to the case where the stepped difference is reduced to substantially not greater than ½.

In order to form the circumferential grooves, a cutting tool having a circular arc shape edge or a V-like shape edge may be used, and accordingly the shape of the edge of the cutting tool may be transferred into the inner surface of the semi-cylindrical bearing.

Embodiment 5

Figure 6:
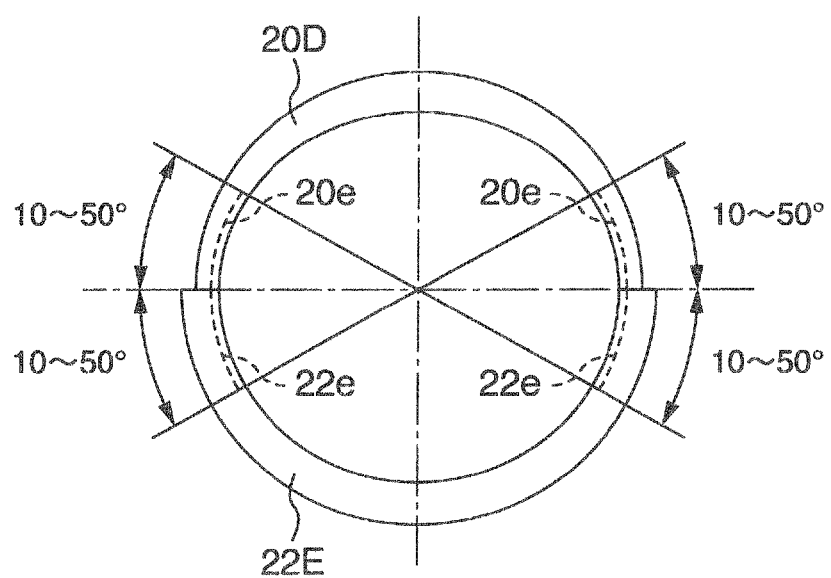
FIG. 6 is a front view illustrating a split-type sliding bearing for a crankshaft in an internal combustion engine, in an embodiment 5 of the present invention, which is fitted in a split-type bearing housing comprised of housing halves having different thermal expansion coefficients from each other, during starting of the internal combustion engine in a cold district.

Explanation will be made of semi-cylindrical bearings having circumferential grooves in a different configuration in FIG. 6. The semi-cylindrical bearings 20D, 22E shown in FIG. 6 have the configurations substantially similar to the semi-cylindrical bearings 20C, 20D shown in FIG. 5, except that the forming range of the circumferential grooves are different from those shown in FIG. 5. That is, the circumferential grooves 20e, 22e are formed in a range of a circumferential length corresponding to a circumferential angle which is at least 10 deg. but 50 deg. at maximum, measured from the circumferential end faces of the semi-cylindrical end faces of the semi-cylindrical bearings, as a starting point. With this configuration, even though a stepped difference is caused between the circumferential end faces of the semi-cylindrical bearings, a wiping event as to the lubrication oil can be effectively prevented, similar to the embodiment 4.

The inner surfaces of the semi-cylindrical bearings have a surface roughness set to be not greater than 3.2 μmRz, which is usual among split-type sliding bearings for a crankshaft.

With this surface roughness, an oil film can be readily formed at the circumferential center of the semi-cylindrical bearing, which is a main load bearing part. Thereby, it is possible to ensure that a sliding bearing has a sufficient load capacity.

The invention claimed is:

1. A split-type sliding bearing for a crankshaft in an internal combustion engine, comprising
a pair of semi-cylindrical bearing halves, the pair of semi-cylindrical bearing halves being mated with each other into a cylindrical body in use, and adapted to be accommodated in a split-type bearing housing having a bearing retaining bore, the bearing retaining bore being bi-split so as to be aligned with the pair of semi-cylindrical bearing halves in the mated condition,
wherein the split-type bearing housing comprises a housing half having a higher thermal expansion coefficient, and a housing half having a lower thermal expansion coefficient,
wherein the pair of semi-cylindrical bearing halves comprise a first semi-cylindrical bearing half being supported on the housing half having the higher thermal expansion coefficient, and a second semi-cylindrical bearing half being supported on the housing half having the lower thermal expansion coefficient, the first and second semi-cylindrical bearing halves having the following dimensional prior to installation in the split-type bearing housing:
(a) the first and second semi-cylindrical bearing halves have an equal outer diameter, and
(b) the first semi-cylindrical bearing half has circumferential ends having a thickness smaller than that of the opposite circumferential ends of the second semi-cylindrical bearing half,
whereby inner surfaces of the first and second semi-cylindrical bearing halves are substantially aligned with each other at circumferential end faces thereof in an installed condition upon thermal contraction between the housing halves resulting in a stepped difference due to a difference between the thermal expansion coefficients at the diameter of the bearing retaining bore between the circumferential end faces of the pair of housing halves when the internal combustion engine is cold.

2. The split-type sliding bearing as set forth in claim 1, wherein a thickness of the second semi-cylindrical bearing half is uniform over the entire circumferential length thereof.

3. The split-type sliding bearing as set forth in claim 1, wherein a thickness of the second semi-cylindrical bearing half is increased from the circumferentially center to the circumferential end faces thereof.

4. The split-type sliding bearing as set forth in claim 1, wherein a thickness of the first semi-cylindrical bearing half is uniform over the entire circumferential length.

5. The split-type sliding bearing as set forth in claim 1, wherein a thickness of the first semi-cylindrical bearing half is decreased from a circumferential center to the circumferential end faces thereof.

6. The split-type sliding bearing as set forth in claim 1, wherein the first and second semi-cylindrical bearing halves have multi circumferential grooves on the inner surfaces thereof, and the circumferential grooves formed in circumferential end zones respectively including the two circumferential end faces of the first and second semi-cylindrical bearing halves have a depth of 5 to 20 µm.

7. The split-type sliding bearing as set forth in claim 6, wherein the circumferential end zones of the inner surface have a range defined by a circumferential length corresponding to a circumferential angle of at least 10 deg, but 50 deg, at maximum, measured from the circumferential end faces as a starting point.

8. The split-type sliding bearing as set forth in claim 7, wherein the inner surface has a surface roughness not higher than 3.2 µmRz, except at the circumferential end zones.

9. The split-type sliding bearing as set forth in claim 6, wherein the circumferential grooves have pitches of 0.3 to 1.5 mm.

10. The split-type sliding bearing as set forth in claim 6, wherein the circumferential grooves on the inner surfaces of the first and second semi-cylindrical bearing halves have a depth equal to or larger than the stepped difference caused between the circumferential end faces of the first and second semi-cylindrical bearing halves.

11. A split-type sliding bearing device for a crankshaft in an internal combustion engine, comprising:
a split-type sliding bearing for a crankshaft in an internal combustion engine, comprised of a pair of semi-cylindrical bearing halves, the pair of semi-cylindrical bearing halves being mated with each other into a cylindrical body in use; and
a split-type bearing housing having a cylindrical bearing retaining bore which is bi-split so as to be aligned with the pair of semi-cylindrical bearing halves in the mated condition, for accommodating and retaining the pair of semi-cylindrical bearing halves therein,
wherein the split-type bearing housing is comprised of a housing half having a higher thermal expansion coefficient, and a housing half having a lower thermal expansion coefficient, and
wherein the pair of semi-cylindrical bearing halves includes a first semi-cylindrical bearing half being supported on the housing half having the higher thermal expansion coefficient, and a second semi-cylindrical bearing half being supported on the housing half having the lower thermal expansion coefficient, the first and second semi-cylindrical bearing half having the following dimensional relationship in a preinstalled condition:
(a) the first and second semi-cylindrical bearing halves have an equal outer diameter, and
(b) the first semi-cylindrical bearing half has circumferential ends having a thickness smaller than that of the opposite circumferential ends of the second semi-cylindrical bearing half,
whereby inner surfaces of the first and second semi-cylindrical bearing halves are substantially aligned with each other at circumferential end faces thereof in an installed condition upon thermal contraction between the housing halves resulting in a stepped difference due to a difference between the thermal expansion coefficients at the diameter of the bearing retaining bore between the circumferential end faces of the pair of housing halves when the internal combustion engine is cold.

12. The split-type sliding bearing device as set forth in claim 11, wherein a thickness of the second semi-cylindrical bearing half is uniform over an entire circumferential length thereof.

13. The split-type sliding bearing device as set forth in claim 11, wherein a thickness of the second semi-cylindrical bearing half is increased from a circumferential center to the circumferential end faces thereof.

14. The split-type sliding bearing device as set forth in claim 11, wherein a thickness of the first semi-cylindrical bearing half is uniform over an entire circumferential length.

15. The split-type sliding bearing device as set forth in claim 11, wherein a thickness of the first semi-cylindrical bearing half is decreased from a circumferential center to the circumferential end faces thereof.

16. The split-type sliding bearing device as set forth in claim 11, wherein the first and second semi-cylindrical bearing halves have multi circumferential grooves on the inner surfaces thereof, and the circumferential grooves formed in circumferential end zones respectively including the two circumferential end faces of the first and second semi-cylindrical bearing halves have a depth of 5 to 20 µm.

17. The split-type sliding bearing device as set forth in claim 16, wherein the circumferential end zones of the inner surface have a range defined by a circumferential length corresponding to a circumferential angle of at least 10 deg, but 50 deg, at maximum, measured from the circumferential end faces as a starting point.

18. The split-type sliding bearing device as set forth in claim 17, wherein the inner surfaces has a surface roughness not higher than 3.2 µmRz, except at the circumferential end zones.

19. The split-type sliding bearing device as set forth in claim 16, wherein that the circumferential grooves have pitches of 0.3 to 1.5 mm.

20. The split-type sliding bearing device as set forth in claim 16, wherein the circumferential grooves on the inner surfaces of the first and second semi-cylindrical bearing halves have a depth equal to or larger than the stepped difference caused between the circumferential end faces of the first and second semi-cylindrical bearing halves.

* * * * *